United States Patent [19]

Blum et al.

[11] Patent Number: 4,975,493
[45] Date of Patent: Dec. 4, 1990

[54] PROCESS FOR THE PRODUCTION OF MOISTURE-HARDENING BINDER COMPOSITIONS AND THEIR USE

[75] Inventors: Harald Blum, Wachtendonk; Josef Pedain, Cologne; Christian Wamprecht, Krefeld; Michael Sonntag, Odenthal, all of Fed. Rep. of Germany

[73] Assignee: Bayer Aktiengesellschaft, Leverkusen, Fed. Rep. of Germany

[21] Appl. No.: 223,803

[22] Filed: Jul. 25, 1988

[30] Foreign Application Priority Data

Aug. 7, 1987 [DE] Fed. Rep. of Germany ....... 3726264

[51] Int. Cl.$^5$ .................................................. C08F 8/00
[52] U.S. Cl. .................................. 525/327.4; 525/375
[58] Field of Search .............................. 525/375, 327.4

[56] References Cited
U.S. PATENT DOCUMENTS 4,043,956   8/1977   Hutton et al. ................... 525/327.6

Primary Examiner—Bernard Lipman
Attorney, Agent, or Firm—Connolly and Hutz

[57] ABSTRACT

A moisture-hardening binder composition for lacquer of coating compositions is prepared by mixing
 (A) 50 to 97 parts by weight of copolymers of maleic anhydride with olefinically unsaturated monomers, said copolymers containing succinic anhydride units and having molecular weights Mw of 1,500 to 75,000 with
 (B) 3 to 50 parts by weight oxazolanes having a molecular weight Mw of 87 to 10,000,
  the quantitative ratios of (A) to (B) being such that the composition contains 0.25 to 10 anhydride groups for every oxazolane group,
wherein component (A) consists essentially of copolymers of
 (a) 4.5 to 45 parts by weight of maleic anhydride,
 (b) 5 to 80 parts by weight of monomers of the formulae

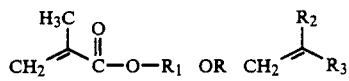

or both, and
 (c) 15 to 92 parts by weight of monomers of the formula

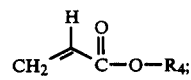

wherein,
 $R_1$ and $R_4$ is each, independent of the other, an aliphatic or cycloaliphatic $C_1$–$C_{12}$ hydrocarbon radical with or without oxygen, sulfur or nitrogen as a heteratom, $R_2$ is hydrogen, methyl, ethyl, chlorine or fluorine,
 $R_3$ is a $C_2$–$C_{15}$ aliphatic hydrocarbon radical, a $C_5$–$C_{10}$ cycloaliphatic hydrocarbon radical, a $C_7$–$C_{18}$ araliphatic hydrocarbon radical, a $C_6$–$C_{12}$ aromatic hydrocarbon radical, chlorine, fluorine, nitrile or a $C_2$–$C_{18}$ hydrocarbon radical containing one or more heteroatoms selected from the group consisting of oxygen, sulfur and nitrogen in the form of ether, ester, amide, urethane, urea, thioester, oxirane, ketone, lactam or lactone groups.

8 Claims, No Drawings

PROCESS FOR THE PRODUCTION OF MOISTURE-HARDENING BINDER COMPOSITIONS AND THEIR USE

This invention relates to a process for the production of moisture-hardening binder compositions consisting essentially of special copolymers containing succinic anhydride and oxazolanes and to their use as binders for lacquers and coating compositions.

BACKGROUND OF THE INVENTION

The use of combinations of copolymers containing succinic anhydride and polyhydroxyl compounds as binders for lacquers and coating compositions is already known from European Published Application No. 48 128. However, the principle of this prior publication cannot be applied to the reaction of amines with anhydrides because this reaction takes place very quickly, even at room temperature, leading to crosslinked products through cleavage of the anhydride. The resulting, extremely short standing times have hitherto prevented polyanhydrides and polyamines from being used together in coating systems.

One possibility of increasing the standing times is to use oxazolanes instead of the amines.

Water-hardening compositions of oxazolanes and polyanhydrides are known in the principle from German Offenlegungeschrift No. 2 610 406 where oxazolanes are combined with polyanhydrides for water-hardening sealing compounds and adhesives. Reaction products of polyunsaturated fatty acids with maleic anhydride and polyanhydrides of $C_3$-$C_6$ alkyl (meth)acrylate and maleic anhydride, more especially of butyl acrylate and maleic anhydride, are described as suitable polyanhydrides.

Tests Conducted by the present inventors have been shown that the systems specifically described by German No. 2 610 406 are still greatly in need of improvement in regard to their suitability for the production of high-quality colorless lacquer films combining extreme hardness with high resistance to solvents and chemicals. This applies both to the systems based on copolymers of maleic anhydride and butyl acrylate which are described in the Examples and to the systems based on reaction products of maleic anhydride with polyunsaturated fatty acid esters which lead to yellowing end products.

Accordingly, the object of the present invention is to provide new binder compositions based on copolymers of maleic anhydride with other olefinically unsaturated monomers and oxazolanes which satisfy exacting practical requirements in regard to their technical lacquer properties, particularly their hardness and resistance to solvents and chemicals, and in regard to the yellowing resistance of the coatings produced from them.

BRIEF DESCRIPTION OF THE INVENTION

According to the invention, this object is achieved by the provision of the process according to the invention which is described in detail hereinafter. The products obtained by the process according to the invention consist essentially of copolymers containing succinic anhydride and oxazolanes, of which the oxazolanes may be present both in admixture with the copolymers and also in a form in which they are chemically bound to the copolymers. In the context of the invention, "copolymers containing succinic anhydride" are understood to be copolymers of maleic anhydride with other olefinically unsaturated monomers of the type described in detail hereinafter which contain "succinic anhydride groups" corresponding to the following formula

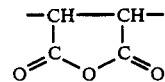

of the type incorporated in the polymer in the polymerization or copolymerization of maleic anhydride.

DETAILED DESCRIPTION

The present invention relates to a moisture-hardening binder composition and to a process for the production of moisture-hardening binder compositions by mixing and, optionally, reaction in the absence of moisture of (A) 50 to 97 parts by weight of copolymers of maleic anhydride with other olefinically unsaturated monomers, the copolymers containing succinic anhydride units and having a molecular weight Mw in the range from 1500 to 75 000, with (B) 3 to 50 parts by weight of oxazolanes having a molecular weight Mw of 87 to 10 000 and optionally containing hydrogen atoms reactive to acid anhydride groups, optionally using solvents and/or other auxiliaries and additives known from lacquer technology, the quantitative ratios between the individual components, including the spontaneous addition reaction optionally taking place between components (A) and (B) in the absence of moisture, being selected so that, for every oxazolanes group, the resulting composition contains 0.25 to 10 anhydride groups, characterized in that component (A) consists of copolymers prepared in known manner of (a) 4.5 to 45 parts by weight maleic anhydride,
(b) 5 to 80 parts by weight monomers corresponding to the following formula

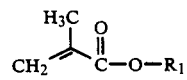

and/or to the following formula

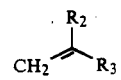

(c) 155 to 92 parts by weight monomers corresponding to the following formula

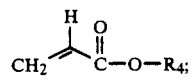

in the above formulae, $R_1$ is an aliphatic or cycloaliphatic $C_1$-$C_{12}$ hydrocarbon radical optionally containing oxygen, sulfur or nitrogen as heteroatom, $R_2$ is hydrogen, a methyl or ethyl group or chlorine or fluorine, $R_3$ is an aliphatic $C_2$-$C_{15}$ hydrocarbon radical, a cycloaliphatic $C_5$-$C_{10}$ hydrocarbon radical, an araliphatic $C_7$-$C_{18}$ hydrocarbon radical, an aromatic $C_6$-$C_{12}$ hydrocarbon radical, chlorine, fluorine, a nitrile group or a $C_2$-$C_{18}$ hydrocarbon radical containing one or more heteroatoms from the group comprising oxygen, sulfur and nitrogen in the form of ether, ester, amide, urethane, urea, thioester, thioether, oxirane, ketone, lactam or lactone groups, and $R_4$ corresponds in its meaning to the definition of $R_1$.

The present invention also relates to the use of the binder compositions obtainable by this process as moisture-hardening lacquers or coating compositions or as binders for the production of such lacquers or coating compositions.

Component (A) consists of copolymers of maleic anhydride with monomers of the type mentioned above under (b) and (c).

Preferred monomers (b) and (c) are those corresponding to the above general formulae in which $R_1$ is a linear or branched, aliphatic $C_1$-$C_8$ hydrocarbon radical, $R_2$ is hydrogen or a methyl group, $R_3$ is an aromatic $C_6$-$C_{12}$ hydrocarbon radical (including aromatic radicals containing aliphatic substituents), a nitrile group, a $C_2$-$C_9$ carboxylate group, a $C_2$-$C_7$ alkoxy group or an aminocarbonyl group optionally containing at the nitrogen atom a $C_1$-$C_6$ alkyl substituent optionally containing ether bridges, and $R_4$ corresponds in its meaning to the definitions of $R_1$.

Typical examples of suitable or preferred substituents $R_1$ and $R_4$ are methyl, ethyl, n-propyl, isopropyl, n-butyl, isobutyl, n-pentyl, n-hexyl, 2-ethylhexyl, n-octyl, n-decyl or n-doecyl radicals.

Typical examples of suitable or preferred substituents $R_2$ are hydrogen, methyl, ethyl, chlorine or fluorine.

Typical examples of suitable of preferred substituents $R_3$ are aliphatic radicals of the type just mentioned by way of example for $R_1$, with the exception of hydrogen and methyl, and also phenyl, cyclohexyl, 2-, 3- and 4-methylphenyl, propoxy, n-butoxy, acetyl, propionyl, n-butyryl or N-methoxymethyl aminocarbonyl radicals.

Preferred components (A) are those in which
(a) 4.5 to 45 parts by weight and preferably 6 to 19 parts by weight maleic anhydride,
(b) 25 to 80 parts by weight and more especially 41 to 65 parts by weight monomers corresponding to the following formulae

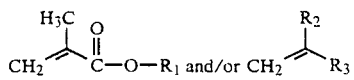

and
(c) 20 to 75 parts by weight, more especially 25 to 50 parts by weight, monomers corresponding to the following formula

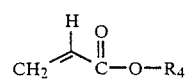

are present in copolymerized form.

Particularly preferred copolymers for component (A) are those corresponding to the above definition in which, optionally in addition to other comonomers, 40 to 140 parts by weight per 100 parts by weight maleic anhydride of other monomers selected from the group comprising styrene, vinyltoluene, α-methyl styrene, α-ethyl styrene, nucleus-substituted diethyl styrenes, isopropyl styrenes, butyl styrenes and methoxystyrenes optionally in the form of isomer mixtures, ethylvinyl ether, n-propylvinyl ether, isopropylvinyl ether, n-butylvinyl ether, isobutylvinyl ether, vinyl acetate, vinyl propionate, vinyl butyrate and mixtures of these monomers are present in copolymerized form.

Component (A), i.e. the copolymers containing succinic anhydride generally have a weight average molecular weight as determined by gel permeation chromatography of 1500 to 75 000, preferably of 3000 to 50 000 and more preferably of 5000 to 35 000. Their anhydride equivalent weight (=quantity in "g" containing 1 mole anhydride groups) is from 4900 to 217 and preferably from 1400 to 326. They are produced in known manner by radically initiated copolymerization, preferably in the presence of organic solvents. The polymerization medium used may be any of the solvents normally used in the lacquer industry which are inert to the monomers and to the copolymers under the polymerization conditions.

Suitable solvents are, for example, esters, such as ethyl acetate, propyl acetate, butyl acetate, isopropyl acetate, isobutyl acetate, sec.-butyl acetate, amyl acetate, hexyl acetate, benzyl acetate, ethyl propionate, butyl propionate, methyl glycol acetate, ethyl glycol acetate, butyl glycol acetate, ethyl diglycol acetate, ethyl glycol acetate, methyl diglycol acetate, butyl diglycol acetate, butyrolactone, propylene glycol methyl ether acetate, for example ethers, such as diisopropyl ether, dibutyl ether, tetrahydrofuran, dioxane, dimethyl diglycol, hydrocarbons, such as gasoline, turpentine oil, solvent naphtha, terpenes, hexane, heptane, octane, cyclohexane, toluene, xylene, ethylbenzene, ketones, such as acetone, methyl ethyl ketone, methyl isobutyl ketone, methyl-n-amyl ketone, methyl isoamyl ketone, diethyl ketone, ethyl butyl ketone, diisopropyl ketone, cyclohexanone, methyl cyclohexanone, isophorone or mixtures of these solvents.

The copolymerization is normally carried out at solids contents of 30 to 95% by weight.

In general, part of the solvent or the total quantity of solvent is initially introduced into the reaction vessel and the monomer mixture, initiator and, optionally, part of the solvent continuously introduced. After the addition, the polymerization mixture is stirred for awhile. The polymerization is terminated after a monomer conversion of more than 96% and preferably more than 99%. It may be necessary for the polymerization mixture to be reactivated by subsequent addition of small quantities of initiator to achieve the desired monomer conversion. With certain starting monomer compositions, it is possible that, after the polymerization, the copolymer may contain relatively large quantities of residual maleic anhydride monomers. For reasons of cost and in cases where this may adversely affect the application envisaged or rather the property level, it is of advantage to reduce this residual monomer content either by distillation or by reactivation with initiator, optionally with simultaneous addition of small quantities of a monomer mixture readily copolymerizable with maleic anhydride, such as for example styrene, butyl acrylate.

Part of the maleic anhydride may also be initially introduced with the solvent or the anhydride may be added dropwise more quickly than the monomers. In certain cases, this modified production process may improve the compatibility of the components of the binder combination.

The monomer conversion is determined by determination of the solids content of the reaction mixture and is monitored by residual monomer analysis by gas chromatography.

The radical formers preferably used are those suitable for reaction temperature of 60° to 180° C., such as organic peroxides, for example: dibenzoyl peroxide, di-tert.-butyl peroxide, dilauryl peroxide, tert.-butyl-peroxy-2-ethyl hexanoate, tert.-butylperoxymnaleate, tert.-butylperoxybenzoate, dicumyl peroxide, didecanoyl peroxide, and azo compounds, for example: 2,2,'-azobis-(2-dimethyl valeronitrile), 2,2,'-azob,is-(isobutyronitrile), 2,2,'-azobis-(2,3-dimethyl butyronitrile), 1,1'-azobis-(1-cyclohexane nitrile).

The initiators may be used in quantities of 0.5 to 10 % by weight, based on total monomers. Molecular weight regulators, such as n-dodecyl mercaptan, tert.-dodecyl mercaptan, mercaptoethanol, etc., may also be used in quantities of from 0 to 10 % by weight.

Component (B) consists of oxazolanes having a weight average molecular weight of 87 to 10 000, preferably of 87 to 3000 and more preferably of 350 to 1500. The molecular weights of up to 1000 can be calculated from the stoichiometry of the starting materials whereas molecular weights of above 1000 can be determined according to gel permeation chromatography. In the context of the invention, "oxazolanes" are understood to be compounds which contain at least 1, preferably 1 to 4 and more especially 2 to 3 oxazolane rings corresponding to the following formula

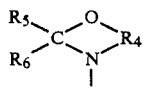

in which
$R_5$ and $R_6$ may be the same or different and represent hydrogen or inert organic radicals, more especially aliphatic hydrocarbon radicals containing 1 to 18, preferably 1 to 8 and more preferably 1 to 4 carbon atoms, or in which
$R_5$ and $R_6$ together with the carbon atom of the heterocyclic ring form a cycloaliphatic ring containing a total of 4 to 9 carbon atoms, more especially a cyclohexane ring, with the proviso that at most one of the radicals $R_5$ or $R_6$ is hydrogen, and
$R_7$ represents an alkylene radical containing 2 to 4 and preferably 2 to 3 carbon atoms, with the proviso that at least 2 carbon atoms are arranged between the oxygen and the nitrogen atom.

Suitable oxazolanes for component (B) are, for example, oxazolanes corresponding to the following formula

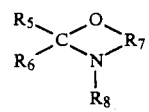

in which
$R_5$, $R_6$ and $R_7$ are as just defined above and $R_8$ is a $C_1$-$C_{12}$ and preferably $C_1$-$C_4$ aliphatic hydrocarbon radical optionally containing hydroxyl or primary or secondary amino groups, hydrogen, an araliphatic $C_7$-$C_{12}$ hydrocarbon radical, an aromatic $C_6$-$C_{12}$ hydrocarbon radical or a cycloaliphatic $C_5$-$C_{10}$ hydrocarbon radical.

In other respects, the nature of the substituent $R_8$ is irrelevant to the suitability of the compounds as component (B) If the substituents $R_8$ are substituents inert to anhydride groups, mixtures of the individual components A) and (B) are formed in the process according to the invention, the inert substituents ultimately being incorporated in the sheet-form materials where the products obtained by the process according to the invention are used in accordance with the invention, so that their properties may be influenced inter alia by suitable choice of the substituents. Where the substituents $R_8$ are hydrogen or hydrocarbon radicals containing groups reactive to anhydride groups, more especially hydroxyl or amino groups, the mixing of the individual components (A) and (B) is followed by a spontaneous addition reaction between the acid anhydride groups on the one hand and the groups reactive to acid anhydride groups on the other hand, so that reaction products of (A) or (B) are completely or partly formed as process products.

Oxazolanes containing more than one oxazolane ring of the above general formula which may be used as component (B) in accordance with the invention may be obtained, for example, from mono-oxazolanes corresponding to the last of the above general formulae in which $R_8$=H or which contain reactive groups in the substituent $R_8$ by modification reactions known per se.

The mono-oxazolanes corresponding to the last of the above general formulae may be prepared in known manner by reaction of corresponding aldehydes or ketones corresponding to the following formula

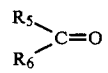

which preferably have a molecular weight of 72 to 200 (ketones) or 58 to 128 (aldehydes), with suitable hydroxyamines of the type mentioned in more detail hereinafter.

Suitable aldehydes are, for example, acetaldehyde, propionaldehyde, butyraldehyde, isobutyraldehyde, trimethyl acetaldehyde, 2,2-dimethylpropanal, 2-ethylhexanal, 3-cyclohex-1-ene carboxaldehyde, hexanal, heptanal, octanal, valeraldehyde, benzaldehyde, tetrahydrobenzaldehyde, hexahydrobenzaldehyde, propargylaldehyde, p-tolylaldehyde, phenylethanal, 2-methylpentanal, 3-methylpentanal, 4-methylpentanal, sorbic aldehyde.

Particularly preferred aldehydes are butyraldehyde, isobutyraldehyde, trimethyl acetaldehyde, 2,2-dimethyl propanal, 2-ethylhexanal, 3-cyclohex-1-ene carboxaldehyde and hexahydro benzaldehyde.

Suitable ketones are, for example, acetone, methyl ethyl ketone, methyl propyl ketone , methyl isopropyl ketone, methyl butyl ketone, methyl isobutyl ketone, methyl-n-amyl ketone, methyl isoamyl ketone, methyl heptyl ketone, diethyl ketone, ethyl butyl ketone, ethyl amyl ketone, diisopropyl ketone, diisobutyl ketone, cyclohexanone, cyclopentanone, methyl cyclohexanone, isophorone, methyl tert.-butyl ketone, 5-methyl- 3-heptanone, 4-heptyl ketone, 1-phenyl-2-propanone, acetophenone, methyl nonyl ketone, dinonyl ketone, 3,3,5-trimethyl cyclohexanone.

Particularly suitable ketones are cyclopentanone, cyclohexanone, methyl cyclopentanone, methyl cyclohexanone, 3,3,5-trimethyl cyclohexanone, cyclobutanone, methyl cyclobutanone, acetone, methyl ethyl ketone, methyl isobutyl ketone.

It is of course also possible to use mixtures of different ketones or aldehydes and also mixtures of ketones with aldehydes to obtain special properties.

The hydroxyamines used for the preparation of component (B) are, in particular, organic compounds containing at least one aliphatic amino group and at least one aliphatically bound hydroxyl group. Although it is also possible to use hydroxyamines containing aromatically or cycloaliphatically bound amino or hydroxyl groups, hydroxyamines such as these are less preferred. The hydroxyamines generally have a molecular weight of 61 to 500 and preferably of 61 to 300.

Suitable hydroxyamines are, for example, bis-(2-hydroxyethyl)-amine, bis-(2-hydroxypropyl)-amine, bis-(2-hydroxybutyl)-amine, bis-(3-hydroxypropyl)-amine, bis-(3-hydroxyhexyl)-amine, N-(2-hydroxypropyl)-N-(2-hydroxyethyl)-amine, 2-(methylamino)-ethanol, 2-(ethylamino)-ethanol, 2-(propylamino)-ethanol, 2-(butylamino)-ethanol, 2-(hexylamino)-ethanol, 2-(cyclohexylamino)-ethanol, 2-amino-2-methyl-1-propanol, 2-amino-2-ethyl-1-propanol, 2-amino-2-propyl-1-propanol, 2-amino-2-methyl-1,3-propanediol, 2-amino-3-methyl-3-hydroxybutane, aminoethanol.

Particularly preferred hydroxyamines are bis-(2-hydroxyethyl)-amine, bis-(2-hydroxypropyl)-amine, bis-(2-hydroxybutyl)-amine, bis-(3-hydroxyhexyl)-amine, 2-(methylamino)-ethanol, 2-(ethylamino)-ethanol, 2-amino-3-methyl-1-propanol and 2-amino-2-ethyl-1-propanol.

Component (B) is prepared by reaction of the starting components, the quantitative ratios between the reactants generally being selected so that, based on the carbonyl groups of the aldehydes or ketones, the hydroxyamines are present in 1 to 1.5 times the equivalent quantity in regard to oxazolane formation. Catalytic quantities of acidic substances, such as for example p-toluene sulfonic acid, hydrogen chloride, sulfuric acid or aluminium chloride, may optionally be used to accelerate the reaction.

The reaction generally takes place at a temperature in the range from 60° to 180° C., the reaction being continued in the presence of an entraining agent to remove the water of reaction until the calculated quantity of water has been eliminated or until water stops being eliminated. The entraining agent and any unreacted starting materials present are then removed by distillation. Suitable entraining agents are, for example, toluene, xylene, cyclohexane, octane. The crude products thus obtained may be used without further purification as component (B) in the process according to the invention for the production of the binder combinations.

To produce oxazolanes of relatively high functionality, it is possible, for example, to modify mono-oxazolanes corresponding to the above general formula, in which $R_8$ is hydrogen or which contain reactive groups (particularly hydroxyl, primary amino or secondary amino groups) in the substituent $R_8$, with at least difunctional reactants. Reactants suitable for modification are, for example, polyisocyanates, polyepoxides, polycarboxylic acids, simple polycarboxylic acid esters or polycarboxylic acid anhydrides. The modification with organic polyisocyanates which is particularly preferred in accordance with the invention may be carried out in accordance with the teaching of DE-OS 2 446 438. Suitable polyisocyanates are the compounds mentioned by way of example in this prior publication. It is particularly preferred to use low molecular weight (cyclo)aliphatic diisocyanates, such as hexamethylene diisocyanate, isophorone diisocyanate or 4,4'-diisocyanatodicyclohexylmethane or relatively high molecular weight NCO prepolymers based on such diisocyanates.

Polyepoxides suitable for modification of the monofunctional oxazolanes are any organic compounds containing at least two epoxide groups in the molecule. It is preferred to use aliphatic bisepoxides having epoxide equivalent weights of 43 to 300, such as for example 1,3-butadiene bisepoxide, 1,5-hexadiene bisepoxide, ethylene glycol diglycidyl ether, glycerol-1,3-diglycidyl ether, 3,4-epoxycyclohexyl methyl-3',4'-epoxycyclohexane carboxylate (Di-epoxide 126, Degussa AG), adipic acid-(3,4-epoxycyclohexyl)-bisester.

The modification reaction between the mono-oxazolanes and the polyepoxides generally takes place at a temperature in the range from 70° to 140° C., optionally using a suitable solvent, such as for example toluene or cyclohexane.

Another method of preparing oxazolanes of relatively high functionality, as shown in Preparation Example B 21, comprises initially converting a polyepoxide into a polyfunctional hydroxyamine by reaction with primary amines and then converting the polyfunctional hydroxyamine into an oxazolane of relatively high functionality by reaction with an aldehyde or a ketone.

Oxazolanes of relatively high functionality may also be prepared by reaction of reactive mono-oxazolanes of the type mentioned with polycarboxylic acids, lower alkyl esters thereof or polycarboxylic acid anhydrides in an esterification reaction (hydroxyl groups in the substitute $R_8$) or in an amide forming reaction (primary or secondary amino groups in the substituent $R_8$).

The mono-oxazolanes containing reactive groups used for the preparation of the oxazolanes of higher functionality may be obtained by using hydroxyamines of the type described by way of example above which, in addition to the hydroxyl and amino groups required for oxazolane formation, contain other hydroxyl or amino groups which do not participate in the formation of the oxazolane. Mono-oxazolanes corresponding to the above general formula, in which the substituent $R_8$ is a hydroxyl group or a reactive amino group, are obtained in this way. However, mono-oxazolanes corresponding to the above general formula, in which $R_8$ is hydrogen, i.e. which have been obtained using simple amino alcohols of the type mentioned by way of example containing a hydroxy group and a primary amino group, may also be used for the above-mentioned modification reactions for the preparation of oxazolanes of relatively high functionality. The reactivity of such secondary amino groups, which are part of the heterocyclic ring, may be roughly equated with the reactivity of primary or secondary amino groups representing substituents of $R_8$.

The molecular weight and functionality of the oxazolanes of relatively high functionality may readily be adjusted through suitable choice of the reactants used for modification of the mono-oxazolanes. Monofunctional mono-oxazolanes are preferably reacted with difunctional or trifunctional reactants in the modification reaction to form bis- or trisoxazolanes having a molecular weight in the range from 350 to 1500.

In the context of the invention, "oxazolanes containing hydrogen atoms reactive to acid anhydride groups" are understood above all to be oxazolanes containing primary or secondary amino groups or hydroxyl groups, for example monooxazolanes corresponding to the above general formula in which $R_8$ is hydrogen or a hydrocarbon radical containing hydroxyl or amino groups. In addition, however, they are also understood to include mixtures of oxazolanes with excess quantities of hydroxyamines of the type used for the preparation of the oxazolanes, irrespective of whether the oxazolanes present in these mixtures themselves still contain free hydroxyl or primary or secondary amino groups.

Mixtures such as these are automatically formed where, based on the carbonyl groups of the aldehydes or ketones, the quantities of hydroxyamines used for the preparation of the oxazolanes are higher than equivalent quantities in regard to oxazolane formation.

The process according to the invention may be carried out, for example, by preparing a mixture of the starting components (A) and (B); where oxazolanes containing free hydroxyl and/or primary or secondary amino groups are used, these reactive groups react off spontaneously with part of component (A) to form reaction products containing ester and/or amide groups. As mentioned above, the free hydroxyl groups and amino groups may be present both in the form of oxazolanes containing chemically bound hydroxyl and amino groups and in the form of hydroxyamines present in admixture with the oxazolanes.

In all variants of the process according to the invention, the type of starting materials used and the quantitative ratios between them are selected so that, including the spontaneous reaction possibly taking place between acid anhydride groups and free amino or hydroxyl groups, the binder combinations ultimately obtained contain for each oxazolane group 0.25 to 10, preferably 0.5 to 5 and more preferably 0.6 to 2.5 anhydride groups.

In this context and also in the foregoing, "oxazolane groups" are understood to be not only structural units corresponding to the following general formula

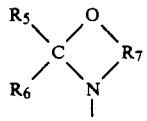

but also imine or enamine structural units which, in certain cases, may be present in a tautomeric equilibrium with the actual oxazolane structural units. The fact that certain oxazolanes form tautomeric equilibria with imines or enamines is irrelevant to the suitability of the oxazolanes as hardener component for the copolymers, so that the compounds or mixtures of compounds in question are referred to as "oxazolanes" irrespective of whether, and to what extent, such tautomeric equilibria are present. In the foregoing quantitative data, the expression "oxazolane groups" is also representative of any tautomeric imine or enamine groups present.

In one preferred embodiment of the process according to the invention, oxazolanes which do not contain any hydrogen atoms reactive to acid anhydride groups are used as component (B). In this case, the products obtained by the process are mixtures containing 50 to 97, preferably 60 to 95 and more preferably 70 to 93 parts by weight of component (A) and 3 to 50, preferably 5 to 40 and more preferably 7 to 30 parts by weight of component (B).

Where oxazolanes containing hydrogen atoms reactive to acid anhydride groups, more especially in the form of primary or secondary amino groups or in the form of hydroxyl groups, are used as component (B), the products obtained by the process are complex mixtures in which reaction products containing amide or ester groups of the copolymers A) with the reactive oxazolanes (B) are present. In addition to these reaction products, the products obtained by the process according to the invention may also contain excess, unreacted copolymers (A) or oxazolanes (B) inert to acid anhydride groups which may have been used. The reaction products containing amide or ester groups may be both reaction products containing oxazolane groups (reaction products of copolymers (A) with oxazolanes containing chemically bound active hydrogen atoms) and also reaction products free from oxazolane groups (reaction products of copolymers (A) with hydroxyamines optionally present in admixture with the oxazolanes). However, their exact composition is largely irrelevant to the suitability of the products obtained by the process according to the invention for use in accordance with the invention, provided that the equivalent ratio of acid anhydride groups to oxazolane groups is within the limits mentioned above. In addition, it is largely irrelevant to the suitability of the products obtained by the process according to the invention whether the spontaneous reaction, if any, taking place between the copolymers (A) and the groups of component (B) reactive to acid anhydride groups has already come completely to an end. If desired, however, this reaction may be terminated by brief heating to 40° to 100° C. before the products obtained by the process according to the invention are used in accordance with the invention. For the rest, the process according to the invention is carried out by mixing of the individual components (A) and (B), preferably at room temperature.

In the practical application of the process according to the invention, it is of course possible to use mixtures of different individual components (A) and (B).

Inert organic solvents or diluents of the type already mentioned by way of example in the foregoing may be added to the products obtained by the process according to the invention before, during or after their production by mixing of the individual components. These solvents or diluents may even be present during the preparation of one or more starting components, as described for example in the foregoing with reference to the preparation of the copolymers containing succinic anhydride according to the invention. The solvents or diluents should be largely anhydrous to ensure an adequate processing time of the mixtures. Solvents or diluents are generally used in the quantities required to establish suitable processing viscosities of the combinations according to the invention. The solids content of the compositions according to the invention to be used in accordance with the invention is generally between 20 and 90% by weight.

However, it is also possible in principle further to reduce the solvent or diluent content by using suitable low-molecular weight copolymers containing succinic anhydride.

The products obtained by the process according to the invention are generally liquid at room temperature, show adequate stability in storage in the absence of water and, after application to a substrate, generally harden quickly in the presence of atmospheric moisture.

In general, films actually crosslinked at room temperature are obtained. The basically very rapid hardening may be further accelerated by drying at elevated temperatures. Temperatures of 80° to 130° C. and drying times of 10 to 30 minutes are advantageous.

Where particularly hydrolysis-stable oxazolanes are used, this forced drying at elevated temperatures may be necessary to obtain the optimal property spectrum.

The lacquers and coating compositions in which the products obtained by the process according to the invention are present as binders and which are to be used in accordance with the invention may contain the auxiliaries and additives normally used in lacquer technology, such as for example pigments, fillers, levelling aids, antioxidants or UV absorbers.

These auxiliaries and additives should be anhydrous and are incorporated in the starting components, generally component (A), preferably before the process according to the invention is carried out. The lacquers and coating compositions containing the products obtained by the process according to the invention as binders generally have a pot life of 1 to 24 hours in the absence of moisture. However, their pot life may be lengthened or shortened as required by selecting suitable reactants. The lacquers and coating compositions may be applied to any, optionally pretreated substrates, such as for example metal, wood, glass, ceramic, stone, concrete, plastics, fabrics, leather, cardboard or paper, by any of the usual methods, for example by spray coating, spread coating, dip coating, flood coating, casting, roll coating.

In the following Examples, all percentages and parts are by weight, unless otherwise indicated.

EXAMPLES (I) Preparation of the copolymers containing succinic anhydride groups:

$A_1$ 1248 g butyl acetate are introduced into a 4 liter reaction vessel equipped with a stirrer, cooling and heating system and heated to 125° C. 262.5 g maleic anhydride and 300 g styrene, 525 g butyl acrylate, 97.5 g 2-ethyl hexyl acrylate, 90 g ethyl acrylate, 150 g butylvinyl ether, 75 g vinyl toluene and 7.5 g n-dodecyl mercaptan are introduced over a period of 3 hours. At the same time, 76.6 g tert.-butyl peroxy-2-ethylhexanoate, 70% in a mixture of hydrocarbons, are added over a period of 4 hours. After stirring for 2 hours at 125° C., another 4.3 g 70% tert.-butyl peroxy-2-ethylexanoate are added. After another 2 hours, the mixture is distilled in a water jet vacuum. The copolymer has a content of succinic anhydride groups of 16.8% while the copolymer solution has a solids content of 56.7% and a viscosity of 904 mPa.s (as measured at 23° C.)

$A_2$ 1254 g butyl acetate are introduced into a 4 liter reaction vessel equipped with a stirrer, cooling and heating system and heated to 122° C. 127.5 g maleic anhydride and 225 g styrene, 322.5 g butyl acrylate, 450 g ethyl acrylate, 225 g methyl methacrylate, 75 g acrylonitrile, 75 g vinyl acetate and 15 g n-dodecyl mercaptan are added over a period of 3 hours. At the same time, 76.6 g tert.-butyl peroxy2-ethylhexanoate, 70% in a mixture of hydrocarbons, are added over a period of 4 -hours. After 2 hours at 122° C., another 4.3 g tert.-butyl peroxy-2-ethylhexanoate are added. After another 2 hours, the mixture is distilled in a water jet vacuum. The copolymer has a content of succinic anhydride groups of 8.1% while the copolymer solution has a solids content of 57.0% and a viscosity of 1190 mPa.s (as measured at 23° C.).

$A_3$ 737.5 g methoxypropyl acetate are introduced into a 2 liter reaction vessel equipped with a stirrer, cooling and heating system and heated to 145° C. 262.5 g maleic anhydride and 262.5 g styrene, 225 g 2-ethyl hexyl acrylate and 3.75 g tert.-dodecyl mercaptan are then added over a period of 3 hours. At the same time, 22.5 g di-tert.-butyl peroxide and 38.8 g methoxypropyl acetate are added over a period of 4 hours. After another hour, another 1.6 g di-tert.-butyl peroxide are added, followed by stirring for 2 hours at 145° C. The copolymer has a content of succinic anhydride groups of 33.7% while the copolymer solution has a solids content of 52.4% for a viscosity of 5210 mPa.s (as measured at 23° C.).

$A_4$ 1200 g methoxypropyl acetate are introduced into a 4-liter reaction vessel equipped with a stirrer, heating and cooling system and heated to 130° C. 375 g maleic anhydride and 675 g 2-ethyl hexyl acrylate, 450 g styrene and 1.5 g n-dodecyl mercaptan are added over a period of 3 hours. At the same time, 42.9 g tert.-butyl peroxy-2-ethylhexanoate, 70% in a mixture of hydrocarbons, and 40.1 g methoxypropyl acetate are added over a period of 4 hours. The reaction mixture is then kept for 1 hour at 130° C. and then distilled to a solids content of 58.9%. The copolymer has a content of succinic anhydride groups of 24.5% while the copolymer solution has a viscosity at 23° C. of 32 900 mPa.s.

$A_5$ 2000 g methoxypropyl acetate are introduced into a 6-liter reaction vessel equipped with a stirrer, heating and cooling system and heated to 130° C. 1125 g butyl acrylate, 750 g styrene and 625 g maleic anhydride are added over a period of 3 hours. At the same time, 50 g azodiisobutyronitrile and 550 g methoxypropyl acetate are added over a period of 4 hours. After stirring for 2 hours, another 5 g azodiisobutyronitrile are added twice at an interval of 45 minutes, followed by stirring for 2 hours. The reaction mixture is then distilled to a solids content of 57.0%, after which the copolymer solution has a viscosity at 23° C. of 12 500 mPa.s. The copolymer has a content of succinic anhydride groups of 24.4%.

$A_6$ 500 g butyl acetate are introduced into a 4-liter reaction vessel equipped with a stirrer, heating and cooling system and heated to 120° C. 187.5 g maleic anhydride, 187.5 styrene and 1125 g butyl acrylate are added over a period of 3 hours. At the same time, 37.5 g azodiisobutyronitrile and 535 g butyl acetate are added over a period of 4 hours, followed by stirring for 1 hour. 3 g azodiisobutyronitrile are then added 3 times, followed by stirring for 2 hours. After distillation to a solids content of 65.4%, a copolymer solution having a viscosity at 23° C. of 1370 mPa.s is obtained. The copolymer has a content of succinic anhydride groups of 12.1%.

$A_7$ 1190 g butyl acetate are introduced into a 6-liter reaction vessel equipped with a stirrer, heating and cooling system and heated to 124° C. 330 g styrene, 1320 g butyl acrylate, 225 g methyl methacrylate and 275 g maleic anhydride dissolved in 644 g butyl acetate are introduced over a period of 4 hours. At the same time, 110 g tert.-butyl peroxy-2-ethylhexanoate, 70% in a mixture of hydrocarbons, are added over a period of 5.5 hours. The reaction mixture is then kept at 124° C. for 1 hour, after which 6.4 g tert.-butyl peroxy-2-ethylhexanoate are added in 2 portions. After another 2 hours, the reaction mixture is distilled in a water jet vacuum. The copolymer solution has a solids content of 57.4% and a viscosity of 956 mPa.s (as measured at 23° C.). The copolymer has a content of succinic anhydride groups of 12.3%.

$A_8$ 1038 g butyl acetate are introduced into a 6-liter reaction vessel equipped with a stirrer, heating and cooling system and heated to 126° C. 1250 g butyl acrylate, 250 g 2-ethyl hexyl acrylate, 300 g methyl methacrylate, 375 g styrene and 325 g maleic anhydride dissolved in 975 g butyl acetate are added over a period of 4 hours. At the same time, 110 g tert.-butyl peroxy-2-ethylhexanoate, 70% in a mixture of hydrocarbons, are added over a period of 5 hours. After 1 hour at 126° C., another 7.2 g tert.-butyl peroxy-2-ethylhexanoate are added, followed by stirring for 2 hours. After brief distillation, a 63.6% copolymer solution having a viscosity of 2280 mPa.s (23° C.) is obtained. The copolymer has a content of succinic acid anhydride groups of 12.6%.

$A_9$ 800 g butyl acetate are introduced into a 4-liter reaction vessel equipped with a stirrer, heating and cooling system and heated to 110° C. 658 g methyl methacrylate, 213 g styrene, 600 g butyl acrylate, 284 g maleic anhydride and 250 g butyl acetate are then added over a period of 2 hours. At the same time, 105 g tert.-butyl peroxy-2-ethylhexanoate, 70% in a mixture of hydrocarbons, and 90 g butyl acetate are added. After stirring for 3 hours at 110° C., a 60.1% copolymer solution having a viscosity of 10 790 mPa.s (23° C.) is obtained. The copolymer has a content of succinic anhydride groups of 12.6%.

$A_{10}$

The procedure described in Example A9 using the same monomers is used to prepare an approximately 60% copolymer solution in butyl acetate in which the monomers are present in the following proportions by weight: 164.1 g methyl methacrylate, 524.1 g butyl acrylate, 116.5 g styrene, 155.4 g maleic anhydride and 39.9 g t-butyl peroxy-2-ethylhexanoate. The solution has a viscosity of 3766 mPa.s at 23° C. The copolymer has a content of succinic anhydride groups of 15.7%.

$A_{11}$

The procedure described in Example A9 is used to prepare an approximately 60% copolymer solution in butyl acetate of which the composition is as follows: 36.00% by weight methyl methacrylate, 32.82% by weight butyl acrylate, 11.65% by weight styrene, 15.54% by weight maleic anhydride, 3.99% by weight t-butyl peroctoate. The solution has a viscosity of 10791 mPa.s at 23° C.

$A_{12}$

The procedure described in Example A9 is used to prepare a copolymer solution having the following composition: 24.62% by weight methyl methacrylate, 36.93% by weight butyl acrylate, 14.77% by weight styrene, 19.69% by weight maleic anhydride, 3.99% by weight t-butyl peroctoate. The solution (approximately 60% in butyl acetate) has a viscosity of 14 061 mPa.s at 23° C.

$A_{13}$

The procedure described in Example A9 and the same monomers are used to prepare an approximately 60% copolymer solution in xylene having the following composition: 38.25% by weight butyl acrylate, 29.50% by weight methyl methacrylate, 13.66% by weight styrene, 14.59% by weight maleic anhydride, 4.00% by weight t-butyl peroctoate. Viscosity of the solution: 9489 mPa.s (23° C.).

$A_{14}$

The procedure described in Example A8 is used to prepare a 56.4% copolymer solution in butyl acetate having the following composition: 16.50% by weight maleic anhydride, 13.59% by weight styrene, 26.22% by weight methyl methacrylate, 40.78% by weight butyl acrylate, 2.91% by weight tert.-butyl peroxy-2-ethylhexanoate. Viscosity of the solution: 1090 mPa.s (23° C.).

$A_{15}$

The procedure described in Example A8 is used to prepare a 49.0% copolymer solution in butyl acetate having the following composition: 15.00% by weight maleic anhydride, 13.50% by weight styrene, 34.50% by weight butyl acrylate, 34.00% by weight methyl methacrylate, 3.00% by weight tert.-butyl peroxy-2-ethylhexanoate. Viscosity of the solution: 971 mPa.s (23° C.).

(II) Preparation of the oxazolanes B:

General procedure:

To prepare the oxazolanes, the hydroxyamines, the carbonyl compounds and, optionally, the entraining agent are mixed and 0.01 to 0.1% of an acidic catalyst optionally added to the resulting mixture. The reaction mixture is then heated under reflux in an inert gas atmosphere (for example $N_2$, Ar) on a water separator until the theoretical quantity of water has separated off or until no more water separates off. The products thus obtained may be used for the combinations according to the invention without any further purification or separation steps. Where the purity or uniformity of the products has to meet particularly exacting requirements, the products may be purified, for example by vacuum distillation.

$B_1$

The crude oxazolane $B_1$ is obtained from 150 g 2-(methylamino)-ethanol, 142.4 g isobutyraldehyde and 77.1 g xylene after separation of 35.9 g water (theoretical quantity: 36 g).

$B_2$

The crude oxazolane $B_2$ is obtained from 210 g diethanolamine, 158.4 g isobutyraldehyde and 92.1 g xylene after separation of 34.2 g water (theoretical quantity: 36 g).

$B_3$

The crude oxazolane $B_3$ is obtained from 150 g 2-(methylamino)-ethanol, 281.6 g 2-ethylhexanal and 107.9 g xylene after separation of 36.1 g water (theoretical quantity: 36 g).

$B_4$

The crude oxazolane $B_4$ is obtained from 122 g 2-amino-ethanol, 158.4 g isobutyraldehyde and 70.1 g xylene after separation of 36.6 g water (theoretical quantity: 36 g).

$B_5$

The crude oxazolane B₅ is obtained from 122 g 2-amino-ethanol, 215.6 g cyclohexanone and 84.4 g xylene after separation of 46 g water (theoretical quantity: 36 g).

B₆

The crude oxazolane B₆ is obtained from 210 g diethanolamine, 215.6 g cyclohexanone and 106.4 g cyclohexane after separation of 44 g water (theoretical quantity: 36 g).

B₇

The crude oxazolane B₇ is obtained from 210 g diethanolamine, 281.6 g 2-ethylhexanal and 122.9 g cyclohexane after separation of 35 g water (theoretical quantity: 36 g).

B₈

The crude oxazolane B₈ is obtained from 150 g 2-(methylamino)-ethanol, 196 g cyclohexanone and 91.4 g xylene after separation of 39 g water (theoretical quantity: 36 g).

B₉

The crude oxazolane B₉ is obtained from 178 g 2-amino-2-methyl-1-propanol, 215.6 g cyclohexanone and 98 g xylene after separation of 41.3 g water (theoretical quantity: 36 g).

B₁₀

The crude oxazolane B₁₀ is obtained from 150 g 2-(methylamino)-ethanol, 176.4 g cyclohexanone and 91.4 g cyclohexane after separation of 30 g water (theoretical quantity: 36 g).

B₁₁

The crude oxazolane B₁₁ is obtained from 266 g bis(2-hydroxypropyl)-amine, 256 g 2-ethylhexanal and 137 g cyclohexane after separation of 35.5 g water (theoretical quantity: 36 g).

B₁₂

The crude oxazolane B₁₂ is obtained from 210 g 2-amino-2-methyl-1,3-propanediol, 158.4 g isobutyraldehyde and 92 g cyclohexane after separation of 39.9 g water (theoretical quantity: 36 g).

B₁₃

The crude oxazolane B₁₃ is obtained from 178 g 2-amino-2-methyl-1-propanol, 252 g pivaldehyde and 108 g cyclohexane after separation of 42.7 g water (theoretical quantity: 36 g).

B₁₄

The bisoxazolane

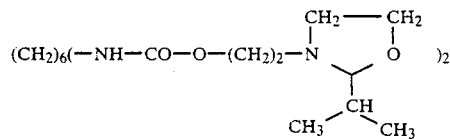

is prepared as described in DE-OS No. 2 446 438, Example 3, from 159 g (1 mole) of the oxazolane B₂, purified beforehand by vacuum distillation, and 84 g (0.5 mole) hexamethylene diisocyanate and dissolved in a mixture of xylene and n-butyl acetate (ratio by weight 1:1) to form a 50% solution.

B₁₅

The bisoxazolane

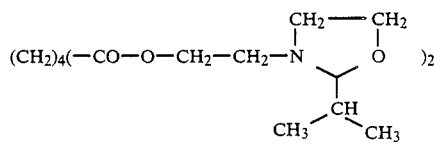

is prepared from 159 g (1 mole) of the purified oxazolane B₂ and 87 g (0.5 mole) adipic acid dimethyl ester by transesterification and elimination of methanol at 150° to 180° C. For use as a reactant for copolymers containing anhydride groups, the product is dissolved in butyl acetate to form a 50% solution.

B₁₆

A polyoxazolane is prepared in accordance with DE-OS No. 2 446 438 from 100 g of an isocyanurate polyisocyanate, which has been prepared by partial trimerization of the NCO groups of hexamethylene diisocyanate in accordance with EP-A-No. 10 589 and which has an NCO content of 21.45 by weight, and 97 g oxazolane B₂ (approx. 20 mole % excess). The highly viscous product is dissolved in butyl acetate to form a 60% solution. The solution has a viscosity of 200 mPa.s at 23° C.

B₁₇

An oxazolane is prepared from 210 g (2 moles) 2-amino-2-methyl-1,3-propanediol, 158.4 g isobutyraldehyde (2.2 moles) and 92.1 g cyclohexane. After removal of excess isobutyraldehyde and cyclohexane by distillation, the product is diluted with 229.9 g dimethyl diglycol. 168 g (1 mole) hexamethylene diisocyanate are then added dropwise at 60° C., after which the reaction mixture is stirred for 6 hours. A 70% solution of the bisoxazolane B₁₇ is obtained.

B₁₈

95.4 g oxazolane B₂ are added dropwise at 60° C. to 100.8 g hexamethylene diisocyanate and 217.2 g butyl acetate, followed by stirring for 6 hours. 21 g diethanolamine are then added dropwise, followed by stirring for 6 hours at 80° C. An approximately 50% solution of the polyoxazolane B₁₇ containing urethane and urea groups is obtained.

B₁₉

536 g trimethylolpropane, 1368 g ε-caprolactone, 476 g dimethyl diglycol and 0.4 g of an esterification catalyst (tin dioctoate) are heated together for 4 h to 140° C. 297.5 g of the trimethylolpropane/ε-caprolactone adduct thus prepared and 265.0 g oxazolane B₂ are heated together to 50° C. After the dropwise addition of 252 g hexamethylene diisocyanate, the mixture is stirred for 6 hours at 70° C. The polyoxazolane B₁₉ is obtained in the form of a 70% solution after addition of 113 g dimethyl diglycol.

B₂₀

672 g hexamethylene diisocyanate and 345.4 g butyl acetate are heated to 64° C., followed by the addition of 134 g trimethylolpropane. After 10 hours at 70° C., the NCO content had fallen to 18.6%. 285.7 g of this 70% NCO prepolymer are diluted with 96.2 g butyl acetate. 202 g oxazolane B₂ are then added dropwise at 60° C., followed by stirring for 6 hours at 70° C. An approximately 70% solution of the polyoxazolane B₂₀ is obtained.

B₂₁

126 g 3,4-epoxycyclohexyl methyl-3', 4'-epoxycyclohexane carboxylate (Diepoxid 126, Degussa AG) and 71.4 g toluene are heated to 50° C. 36.5 g n-butylamine and 44 g 1-amino-3-methyl aminopropane are then added dropwise, the temperature being increased to 110° C. After 3 hours, the reaction mixture is cooled to 50° C. and 79.2 g isobutyraldehyde added dropwise. The temperature is then increased to the reflux temperature until 18.5 g water have separated off (theoretical: 18 g). The polyoxazolane $B_{21}$ is obtained.

(III) Preparation of the comparison polyanhydrides:

Examples 8 and 9 of DE-OS No. 2 610 406 were reproduced for comparison purposes:

A (C) 22 (corresponds to Example 9 of DE-OS No. 2 610 406)

600 g xylene are introduced into a 3-liter reaction vessel equipped with a stirrer, heating and cooling system and water separator and heated to 139° C. 225 g maleic anhydride, 1275 g butyl acrylate and 60 g 75% t-butyl peracetate are added dropwise over a period of 3¼ hours. After a further 15 minutes, another 6 g 75% t-butyl peracetate and 40 g xylene were added. The product thus obtained has a viscosity of 402 mPa.s/23° C. for a solids content of 74.0%.

A (C) 23 (corresponds to Example 8 of DE-OS No. 2 610 406)

338.6 g toluene, 142.5 g butyl acetate, 22.5 g maleic anhydride and 0.5 g t-butyl peroctoate are introduced into a 3-liter reaction vessel equipped with a stirrer, heating and cooling system and water separator and heated to 114° C. After 15 minutes at 114° C., 757.5 g butyl acrylate, 77.5 g maleic anhydride and 2.5 g t-butyl peroctoate were added over a period of 2¾ hours. After another 15 minutes, 3 g t-butyl peroctoate and 97 g toluene were added. The product thus obtained has a viscosity of 3710 mPa.s/23° C. for a solids content of 75%.

(IV) Preparation of the binder compositions according to the invention:

The copolymers A containing succinic anhydride groups and the oxazolanes B are mixed together at room temperature and adjusted to a viscosity suitable for processing, optionally by addition of an organic solvent or diluent. The films are drawn onto glass plates using a film drawer, the film thickness of the wet films being 120 to 150 μm. After ageing, i.e. storage for 16 to 20 hours at room temperature (RT) or 30 mins/60° C.+1 hour drying at room temperature or 20 mins./100° C.+1 hour drying at room temperature, clear crosslinked films having very good mechanical properties are obtained.

Depending on the hydrolysis stability of the oxazolanes, it is advisable to determine the hardening conditions required for optimal crosslinking, such as for example 1 hour/room temperature or 30 mins./60° C.+1 hour at room temperature or 20 mins./100° C.+1 hour at room temperature, in a preliminary test.

The compositions of the binder combinations, the drying temperatures, the standing time and also the solvent resistance as a measure of crosslinking are shown in the following Tables.

The solvent resistance is determined by placing cotton wool plugs impregnated with methyl isobutyl ketone (MIBK) or xylene or butyl acetate on the films. After 1 minute under load, the film is examined for visible changes. The evaluation scale extends from 1 to 5, 1 standing for satisfactory and 5 for completely detached.

The standing time is the period of time in which the initial viscosity of the binder composition doubles.

The solids content of the binder compositions was determined by calculation on the basis of the experimentally determined solids contents of the copolymers containing succinic anhydride groups and the calculated solids contents of the oxazolanes.

All the films of the binder compositions according to the invention dry tack-free at room temperature after 1 hour at the latest. Comparison Examples C 28 and C 29 produced tacky films, even after drying for 24 hours at room temperature. In addition, the films were yellowish in color and achieved only low solvent resistance levels.

TABLE I

| (Examples) | 1 | 2 | 3 | 4 | 5 | 6 |
|---|---|---|---|---|---|---|
| Copolymer containing succinic anhydride groups | 70 g $A_1$ | 70 g $A_2$ | 70 g $A_3$ | 70 g $A_4$ | 70 g $A_5$ | 70 g $A_6$ |
| Oxazolane | 8.8 g $B_2$ | 8.8 g $B_2$ | 8.1 g $B_2$ | 9.1 g $B_2$ | 8.8 g $B_2$ | 10.1 g $B_2$ |
| Molar ratio[1] | 1.5:1 | 1.3:1 | 3.1:1 | 2.2:1 | 1.1:1 | 1.6:1 |
| Solids content of the binder composition | 59.6% | 59.3% | 53.5% | 55.0% | 56.0% | 67.2% |
| Initial viscosity (mPa.s) | 900 | 700 | 2510 | 3140 | 3870 | 770 |
| Standing time (hours) | 1 | 1 | 1 | 1 | 1 | 2 |
| Drying conditions | 16 h/RT | 16 h/RT | 16 h/RT | 16 h/RT | 16 h/RT | 16 h/RT |
| Solvent resistance (MIBK/xylene/butyl acetate) | 1/1/1 | 1/1/1 | 1/1/1 | 1/1/1 | 1/1/1 | 1/1/1 |
| Appearance of the film | colorless | colorless | colorless | colorless | colorless | colorless |
| (Examples) | 7 | 8 | 9 | 10 | 11 | 12 |
| Copolymer containing succinic anhydride groups | 70 g $A_5$ | 70 g $A_5$ | 70 g $A_6$ | 70 g $A_6$ | 70 g $A_5$ | 70 g $A_5$ |
| Oxazolane | 8.8 g $B_4$ | 8.8 g $B_5$ | 8.7 g $B_6$ | 8.7 g $B_7$ | 8.8 g $B_8$ | 8.8 g $B_9$ |
| Molar ratio[1] | 1.6:1 | 2:1 | 1.5:1 | 1.8:1 | 2.2:1 | 2.4:1 |
| Solids content of the binder composition | 55% | 55% | 66.4% | 66.4% | 55% | 55% |
| Initial viscosity (mPa.s) | 6070 | 5020 | 670 | 570 | 2090 | 2110 |
| Standing time (hours) | 3 | 3 | 1 | 2 | 3 | 6 |
| Drying conditions | 16 h/RT | 16 h/RT | 16 h/RT | 16 h/RT | 30'/60° C. | 30'/60° C. |
| Solvent resistance | 1/1/1 | 1/1/1 | 1/1/1 | 1/1/1 | 1/1/1 | 1/1/1 |

TABLE I-continued

| (MIBK/xylene/butyl acetate) Appearance of the film | colorless | pink tinge | colorless | colorless | colorless | colorless |
|---|---|---|---|---|---|---|
| (Examples) | 13 | 14 | 15 | 16 | 17 | 18 |
| Copolymer containing succinic anhydride groups | 70 g $A_5$ | 70 g $A_5$ | 70 g $A_5$ | 70 g $A_5$ | 70 g $A_5$ | 70 g $A_5$ |
| Oxazolane | 8.8 g $B_{10}$ | 8.8 g $B_3$ | 8.8 g $B_1$ | 8.8 g $B_{11}$ | 8.8 g $B_{12}$ | 8.8 g $B_{13}$ |
| Molar ratio[1] | 2.2:1 | 2.6:1 | 2.0:1 | 3.4:1 | 2.3:1 | 2.3:1 |
| Solids content of the binder composition | 55% | 55% | 55% | 55% | 55% | 55% |
| Initial viscosity (mPa.s) | 2350 | 2720 | 1880 | 2680 | 2780 | 1740 |
| Standing time (hours) | 2 | 2 | 5 | 4 | 1 | 6 |
| Drying conditions | 30'/60° C. | 30'/60° C. | 30'/60° C. | 20'/100° C. | 20'/100° C. | 20'/100° C. |
| Solvent resistance (MIBK/xylene/butyl acetate) | 1/1/1 | 1/1/1 | 1/1/1 | 1/1/1 | 1/1/1 | 1/1/1 |
| Appearance of the film | colorless | colorless | colorless | colorless | colorless | colorless |
| (Examples) | 19 | 20 | 21 | 22 | 23 | 24 |
| Copolymer containing succinic anhydride groups | 70 g $A_6$ | 70 g $A_4$ | 70 g $A_1$ | 70 g $A_2$ | 70 g $A_2$ | 30 g $A_3$/ 34 g $A_6$ |
| Oxazolane | 6.4 g $B_1$ | 12.9 g $B_1$ | 8.8 g $B_1$ | 5.5 g $B_1$ | 8.8 g $B_1$ | 9.8 g $B_1$ |
| Molar ratio[1] | 1.7:1 | 1.5:1 | 1.4:1 | 1.1:1 | 0.7:1 | 1.4:1 |
| Solids content of the binder composition | 66.6% | 58.0% | 59.3% | 58.7% | 59.3% | 61.5% |
| Initial viscosity (mPa.s) | 804 | 1980 | 450 | 804 | 450 | 940 |
| Standing time (hours) | 24 | 5 | 8 | 36 | 8 | 3 |
| Drying conditions | 16 h/RT | 16 h/RT | 16 h/RT | 16 h/RT | 16 h/RT | 16 h/RT |
| Solvent resistance (MIBK/xylene/butyl acetate) | 1/1/1 | 1/1/1 | 1/1/1 | 1/1/1 | 1/1/1 | 1/1/1 |
| Appearance of the film | colorless | colorless | colorless | colorless | colorless | colorless |
| (Examples and Comparisons) | 25 | 26 | 27 | C28 | C29 | 30 |
| Copolymer containing succinic anhydride groups | 72 g $A_8$ | 40 g $A_7$ | 74 g $A_9$ | 64.2 g A(C)22 | 70 g A(C)23 | 70 g $A_{14}$ |
| Oxazolane | 10.1 g $B_2$ | 5 g $B_2$ | 8.8 g $B_2$ | 8.8 g $B_1$ | 6.5 g $B_1$ | 11.8 g $B_{17}$ |
| Molar ratio[1] | 1.1:1 | 1.1:1 | 1.6:1 | 1.5:1 | 1.5:1 | 1.9:1 |
| Solids content of the binder composition | 65.6% | 62.2% | 62.2% | 74.7% | 75.4% | 58.4% |
| Initial viscosity (mPa.s) | 1370 | 1120 | 5650 | 122 | 2200 | 2010 |
| Standing time (hours) | 2 | 3 | 1 | >24 | 12 | 8 |
| Drying conditions | 16 h/RT | 16 h/RT | 16 h/RT | 16 h/RT | 16 h/RT 16 | 16 h/RT |
| Solvent resistance (MIBK/xylene/butyl acetate) | 1/1/1 | 1/2/2 | 1/1/1 | 5/5/5 | 4/5/4 | 1/1/1/2 |
| Appearance of the film | colorless | colorless | colorless | yellow tacky after 24 h/RT | slightly yellow tacky after 24 h/RT | colorless |

| (Examples and Comparisons) | 31 | 32 | 33 | 34 |
|---|---|---|---|---|
| Copolymer containing succinic anhydride groups | 100 g $A_{14}$ | 70 g $A_{15}$ | 70 g $A_{15}$ | 70 g $A_{14}$ |
| Oxazolane | 52.7 g $B_{18}$ | 18.6 g $B_{19}$ | 18.8 g $B_{20}$ | 11.1 g $B_{21}$ |
| Molar ratio[1] | 1.3:1 | 2.0:1 | 1.3:1 | 2.1:1 |
| Solids content of the binder composition | 54.2% | 54.2% | 54.5% | 59.3% |
| Initial viscosity (mPa.s) | 610 | 1610 | 650 | 2210 |
| Standing time (hours) | 8 | 4 | 4 | 1 |
| Drying conditions | 16 h/RT | 16 h/RT | 16 h/RT | 16 h/RT 16 |
| Solvent resistance (MIBK/xylene/butyl acetate) | 1/1/1/2 | 1/1/1/1 | 2/1/1/3 | 1/1/1/1 |
| Appearance of the film | colorless | colorless | colorless | colorless |

[1]Molar ratio of oxazolane groups to anhydride groups

EXAMPLES 35 to 39

Examples 35 to 39 are further examples of the lacquer compositions according to the invention and describe the resulting properties of the lacquer films under various conditions. As in the preceding Examples in Table 1, the wet films are applied to clean, degreased glass plates and to steel plates finished with a wash primer based on polyvinyl butyrate. The dried clear lacquer films are 30 to 45 μm thick. The tests are directed to the use of the lacquer compositions as a clear lacquer for car repair lacquers.

TABLE II

| (Examples) | 35 | 36 | 37 | 38 | 39 |
|---|---|---|---|---|---|
| Lacquer solutions: | | | | | |
| Copolymer | 105.0 g A 10 | 105 g A 10 | 105 g A 11 | 82.8 g A 12 | 82.8 g A 12 |
| Oxazolane | 44.5 g B 14 | 40 g B 15 | 44.8 g B 14 | 44.8 g B 14 | 40 g B 15 |
| Molar ratio | 1.1:1 | 1.1:1 | 1.1:1 | 1.1:1 | 1.1:1 |
| Addition of butyl acetate | 67.2 g | 61.0 g | 62.7 g | 51.6 g | 49.0 g |
| Silicone oil as levelling aid (10% in methoxy propylene glycol acetate) | 1.0 g | 1.0 g | 1.0 g | 1.0 g | 1.0 g |
| Flow-out times (DIN 53211, 4 mm orifice) | | | | | |
| 0 h | 15 secs. | 14 secs. | 18 secs. | 27 secs. | 18 secs. |
| 3 h | 16 secs. | 16 secs. | 22 secs. | 22 secs. | 32 secs. |
| 6 h | 17 secs. | 17 secs. | 23 secs. | 34 secs. | 40 secs. |
| 24 h | 17 secs. | 19 secs. | 28 secs. | 37 secs. | 68 secs. |
| Appearance of the solutions | clear colorless | clear colorless | clear colorless | clear colorless | clear colorless |
| Drying according to DIN 53150 | | | | | |
| $T_1$ (scattering on of glass beads) | <15 mins. | <15 mins. | <15 mins. | <15 mins. | <15 mins. |
| $T_3$ (assembly strength) | <60 mins. | <60 mins. | <60 mins. | <60 mins. | <60 mins. |
| Konig pendulum hardness (DIN 53157) (after storage at 60% relatively air humidity) | | | | | |
| 1 day 23° C. | 114 secs. | 103 secs. | 130 secs. | 145 secs. | 148 secs. |
| 3 days 23° C. | 125 secs. | 114 secs. | 147 secs. | 156 secs. | 160 secs. |
| 5 days 23° C. | 138 secs. | 130 secs. | 160 secs. | 170 secs. | 170 secs. |
| 5 days 23° C. + 3 h 70° C. | 137 secs. | 130 secs. | 158 secs. | 165 secs. | 167 secs. |
| Layer thickness μm | 40 | 35 | 35 | 45 | 40 |
| Erichsen indentation (DIN 43156) in mm after 5 days at 23° C. | 9.5 | 9.0 | 9.5 | 8.5 | 9.0 |
| **Dissolvability* in super-grade gasoline** | | | | | |
| Age of the film: Contact time: | | | | | |
| 1 day 23° C. 1 min. | 0 | 1 | 0 | 0 | 0 |
| 1 day 23° C. 5 mins. | 2 | 3 | 0 | 0 | 1 |
| Age of the film: Contact time: 3 days 23° C. 5 mins. (60% relative humidity) in the solvents | | | | | |
| ethyl glycol acetate | 1 | 0 | 0 | 0 | 0 |
| ethyl acetate | 1 | 0 | 0 | 0 | 0 |
| toluene | 2 | 2 | 1 | 0 | 0 |
| acetone | 4 | 4 | 4 | 3 | 3 |
| super-grade gasoline | 0 | 0 | 0 | 0 | 0 |

*Dissolvability was measured in 5 stages: 0, 1, 2, 3, 4,
0 = film completely unchanged
4 = film dissolves

Summary of the results of Examples 35 to 39

The lacquer solutions according to the invention are stable in the absence of moisture. The increase in viscosity during storage is minimal. They harden quickly under ambient conditions to form crosslinked elastic lacquer films. Hardness and solvent resistance are both high.

They are therefore eminently suitable for use as car repair lacquers and, in some cases, are superior to the prior art.

EXAMPLE 40

This Example describes the production of pigmented lacquer films from the copolymer A 13 and the oxazolane B 16. The pigment is first ground with copolymer A 13 on a three-roll mixer.

Composition:

| Constituents | Parts by weight |
|---|---|
| Copolymer solution A 13 | 1000 |
| Solvent butyl acetate | 220 |
| Levelling aid silicone oil (10% solution in methoxypropylene glycol acetate) | 8 |
| Titanium dioxide (rutile type) | 400 |
| Pigment sedimentation inhibitor (highly disperse silica) | 4 |

8.9 parts (A) 19.6 parts (B) and 29.5 parts (C) oxazolane B 16 were then added to and carefully mixed with 100 parts of the composition, corresponding to a molar ratio of 2.9:1, 1.3:1 and 0.9:1, respectively. In the absence of moisture, i.e. in a sealed container, the three lacquer compositions (A, B, C) may be stored for at least 1 month without change.

Samples of the lacquers ready for spraying are sprayed onto 0.5 mm thick ingot steel plates and the test specimens stored for 5 days at around 23° C./approx. 60% relative air humidity.

Results:

| Sample | Hardness secs. | Adhesive strength (Gt. 0-4) | Glass |
|---|---|---|---|
| A | 153 | 1 | 95 |
| B | 178 | 0 | 98 |
| C | 170 | 0 | 95 |

The degree of crosslinking or rather the solvent resistance of the three samples is different according to the oxazolane content:

The evaluation is based on the scale of 0 to 4 introduced in Table 2.

Results:

| Sample | Ethyl glycol acetate | 5 mins.' contact toluene | acetone | super-grade gasoline |
|---|---|---|---|---|
| A | 2 | 3 | 4 | 1 |
| B | 2 | 1 | 4 | 0 |
| C | 0 | 0 | 3 | 0 |

Summary of the results:

The binders according to the invention may also be processed to form pigmented high-gloss lacquers characterized by good performance properties. The degree of crosslinking depends on the oxazolane content. A certain resistance to solvents is achieved even in cases of subequivalent crosslinking.

What is claimed is:

1. A process for the production of moisture-hardening binder composition which comprises mixing
   (A) 50 to 97 parts by weight of copolymers of (a) maleic anhydride with olefinically unsaturated monomers, said copolymers containing succinic anhydride units and having molecular weights Mw of 1,500 to 75,000 with
   (B) 3 to 50 parts by weight oxazolanes having a molecular weight Mw of 87 to 10,000,
   the quantitative ratios of (A) to (B) being such that the composition contains 0.25 to 10 anhydride groups for every oxazolane group,
   wherein component (A) consists essentially of copolymers
   (a) 6 to 19 parts by weight of maleic anhydride,
   (b) 41 to 65 parts by weight of monomers of the formulae

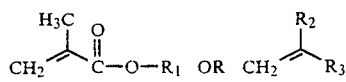

or both, and
   (c) 25 to 50 parts by weight of monomers of the formula

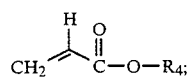

with the sum of parts for (a), (b) and (c) being 100 and wherein,
   $R_1$ and $R_4$ is each, independent of the other, aliphatic or cycloaliphatic $C_1$-$C_{12}$ hydrocarbon radical with or without oxygen, sulfur or nitrogen as a heteroatom, $R_2$ is hydrogen, methyl, ethyl, chlorine or fluorine,
   $R_3$ is a $C_2$-$C_{15}$ aliphatic hydrocarbon radical, a $C_5$-$C_{10}$ cycloaliphatic hydrocarbon radical, a $C_7$-$C_{18}$ araliphatic hydrocarbon radical, a $C_6$-$C_{12}$ aromatic hydrocarbon radical, chlorine, fluorine, nitrile or a $C_2$-$C_{18}$ hydrocarbon radical containing one or more heteroatoms selected from the group consisting of oxygen, sulfur and nitrogen in the form of ether, ester, amide, urethane, urea, thioester, oxitrane, ketone, lactam or lactone groups.

2. A process as claimed in claim 1, wherein the quantitative ratios of (A) and (B) are such that the composition obtained contain 0.6 to 2.5 anhydride groups for every oxazolane group.

3. A process as claimed in claim 1, wherein oxazolanes reactively inert to acid anhydride groups are component (B) and the quantitative ratios between (A) and (B) are such that the resulting mixture contain 50 to 97 parts by weight of component (A) and 3 to 50 parts by weight of component (B).

4. A process as claimed in claim 1 wherein component (A) is a copolymer containing per 100 parts by weight maleic anhydride, 40 to 140 parts by weight of monomers comprising styrene, vinyl toluene, alpha-methyl styrene, alpha-ethyl styrene, ring-substituted diethyl styrenes, isopropyl styrenes, butyl styrenes and methoxystyrenes, ethylvinyl ether, n-propylvinyl ether, isopropylvinyl ether, n-butylvinyl ether, isobutylvinyl ether, vinyl acetate, vinyl propionate, vinyl acetate, vinyl propionate, vinyl butyrate or mixtures said monomers in copolymerized form.

5. A process as claimed in claim 1 wherein component (B) comprises compounds having a molecular weight of 87 to 3,000 and containing 1 to 4 oxazolane rings corresponding to the formula

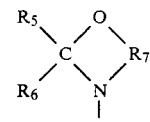

in which
$R_5$ and $R_6$ may be the same or different and represent hydrogen or $C_1$-$C_8$ alkyl or $R_5$ and $R_6$ together with the carbon atom of the oxazolane ring form a cycloaliphatic hydrocarbon radical containing a total of 5 or 9 carbon atoms, with the proviso that at most one of the substituents $R_5$ or $R_6$ is hydrogen, and $R_7$ is a $C_2$-$C_4$ alkylene, with the proviso that at least 2 carbon atoms are between the oxygen atom and the nitrogen atom.

6. A process as claimed in claim 5 wherein component (B) comprises compounds having a molecular weight of 350 to 1,500 which contains two or three oxazolane.

7. Binder compositions containing the product obtained from the process of claim 1.

8. Moisture hardening lacquer or coating compositions containing a binder composition according to claim 7.